US010709528B2

(12) United States Patent
Kim et al.

(10) Patent No.: US 10,709,528 B2
(45) Date of Patent: Jul. 14, 2020

(54) METHOD FOR DESIGNING DENTAL PROSTHESIS, APPARATUS THEREFOR, AND RECORDING MEDIUM HAVING SAME RECORDED THEREON

(71) Applicants: OSSTEMIMPLANT CO., LTD., Seoul (KR); SEOUL NATIONAL UNIVERSITY R&DB FOUNDATION, Seoul (KR); UNIVERSITY OF ULSAN FOUNDATION FOR INDUSTRY COOPERATION, Ulsan (KR)

(72) Inventors: Namkug Kim, Seoul (KR); Mooyong Park, Seoul (KR); Seongyun Lee, Seoul (KR); Byunghee Han, Seoul (KR); Il-Hyung Yang, Seongnam-si (KR); In-Sung Yeo, Seoul (KR)

(73) Assignees: OSSTEMIMPLANT CO., LTD., Seoul (KR); SEOUL NATIONAL UNIVERSITY R&DB FOUNDATION, Seoul (KR); UNIVERSITY OF ULSAN FOUNDATION FOR INDUSTRY COOPERATION, Ulsan (KR)

( * ) Notice: Subject to any disclaimer, the term of this patent is extended or adjusted under 35 U.S.C. 154(b) by 413 days.

(21) Appl. No.: 15/552,553

(22) PCT Filed: Feb. 23, 2016

(86) PCT No.: PCT/KR2016/001736
§ 371 (c)(1),
(2) Date: Aug. 22, 2017

(87) PCT Pub. No.: WO2016/137190
PCT Pub. Date: Sep. 1, 2016

(65) Prior Publication Data
US 2018/0333235 A1 Nov. 22, 2018

(30) Foreign Application Priority Data

Feb. 23, 2015 (KR) .................. 10-2015-0024938
Feb. 23, 2016 (KR) .................. 10-2016-0020995

(51) Int. Cl.
*A61C 13/00* (2006.01)
*A61C 13/01* (2006.01)

(52) U.S. Cl.
CPC .......... *A61C 13/0004* (2013.01); *A61C 13/01* (2013.01)

(58) Field of Classification Search
CPC .................. A61C 13/0004; A61C 13/01
See application file for complete search history.

(56) References Cited

U.S. PATENT DOCUMENTS 8,583,270 B2 * 11/2013 Schneider ............... G06F 30/00
700/98
2007/0238065 A1 * 10/2007 Sherwood ............... A61C 7/00
433/24

(Continued)

FOREIGN PATENT DOCUMENTS

KR 10-2011-0095675 8/2011
KR 10-2015-0010119 1/2015
WO 2012/126669 9/2012

OTHER PUBLICATIONS

Bae, Kwang-Hak, Hyun-Duck Kim, Se-Hwan Jung, Deok-Young Park, Dai-Il Paik, and Sung-Chang Chung. "Physical pain in Oral Health Impact Profile among Korean adults (55+): Distribution and associated factors." (2003). (Year: 2003).*

(Continued)

*Primary Examiner* — Rehana Perveen
*Assistant Examiner* — Chuen-Meei Gan
(74) *Attorney, Agent, or Firm* — Kile Park Reed & Houtteman PLLC

(57) ABSTRACT

Disclosed are a method for designing dental prosthesis, an apparatus for the same, and a recording medium for recording the same. According to the method, sore spots on which a patient may feel pain due to wearing a dental prosthesis are predicted based on a sore spot distribution model which has been modeled with a plurality of data, and the dental prosthesis is digitally designed based on the predicted results. Accordingly, it is possible to improve the prediction accuracy of sore spots and rapidly design the prosthesis which is more appropriate for the patient.

16 Claims, 4 Drawing Sheets

(56) References Cited

U.S. PATENT DOCUMENTS

| | | | | |
|---|---|---|---|---|
| 2007/0264612 | A1* | 11/2007 | Mount | A61C 8/00 433/173 |
| 2008/0064008 | A1* | 3/2008 | Schmitt | A61C 13/0004 433/140 |
| 2009/0220916 | A1 | 9/2009 | Fisker et al. | |
| 2009/0287332 | A1* | 11/2009 | Adusumilli | A61C 13/0004 700/98 |
| 2010/0151417 | A1* | 6/2010 | Nilsson | A61C 7/002 433/167 |
| 2011/0276159 | A1* | 11/2011 | Chun | A61C 11/00 700/98 |
| 2014/0227655 | A1 | 8/2014 | Andreiko et al. | |
| 2017/0360533 | A1* | 12/2017 | Choi | A61C 8/00 |

OTHER PUBLICATIONS

Al-Khabbaz, Areej K., Terrence J. Griffin, and Khalaf F. Al-Shammari. "Assessment of pain associated with the surgical placement of dental implants." Journal of periodontology 78, No. 2 (2007): 239-246. (Year: 2007).*

J, Kasperski & Zmudzki, Jaroslaw & Chladek, Grzegorz. (2010). Denture foundation tissues loading criteria in evaluation of dentures wearing characteristics. Journal of Achievements in Materials and Manufacturing Engineering. 43. (Year: 2010).*

Zmudzki, Jaroslaw, Grzegorz Chladek, and Jacek Kasperski. "The influence of a complete lower denture destabilization on the pressure of the mucous membrane foundation." Acta of Bioengineering & Biomechanics 14, No. 3 (2012). (Year: 2012).*

Zmudzki, Jaroslaw & Chladek, Grzegorz & Malara, P. & Dobrzanski, Leszek & Zorychta, M. & Basa, K.. (2013). The simulation of mastication efficiency of the mucous-borne complete dentures. Archives of Materials Science and Engineering. 63. 75-86. (Year: 2013).*

International Search Report for International Application No. PCT/KR2016/001736, dated Jul. 25, 2016.

* cited by examiner (a)

(b)

METHOD FOR DESIGNING DENTAL PROSTHESIS, APPARATUS THEREFOR, AND RECORDING MEDIUM HAVING SAME RECORDED THEREON

FIELD

The present invention relates to a method for digitally designing dental prosthesis, an apparatus for the same, and a recording medium for recording the same.

BACKGROUND OF THE INVENTION

For multiple tooth-loss case, a denture is generally used instead of a tooth-attaching type prosthesis. The denture is a kind of detachable prosthesis, which substitutes multiple lost teeth with one body. When manufacturing the denture, it is important to design the denture in optimal shape for a patient by considering synthetically relationship of maxilla and mandible, distance between maxilla and mandible, and mandibular movements, etc.

Because the denture is supported by gingiva and covers jawbones structurally, when the patient moves for mastication, the denture applies pressure onto mucous membrane of oral cavity and causes pain on the mucous membrane. Therefore, many patients have been complaining their discomfort due to wearing the denture. Particularly, in case of the edentulous patient who has no tooth, the denture covers the larger area to increase the pain.

For preventing situation mentioned above, it is needed to know the painful area, where the patient would feel the pain from the denture, in advance in denture designing process, and to manufacture a tray or denture for the patient with the painful area.

As of now, doctors predict the painful area based on their experiences and applies the predicted results to the design of the denture. According to this method, the common painful area of lots of patients is easily predictable, but the individual painful area of each patient is not. In addition, there are wide variations according to doctors with their own experiences.

Furthermore, when manufacturing the dental prosthesis with the predicted results, an analog method that is accompanied by a physical impression taking has been being used. The analog method causes a lot of inconvenience to patients and delay of manufacturing process of denture.

Therefore, when predicting the painful area, if a method for designing dental prosthesis that is able to reduce dependence on doctor's experience and improve accuracy of prediction is provided, it could contribute to manufacture the dental prosthesis which provides high satisfaction to patients.

DETAILED DESCRIPTION OF THE INVENTION

Technical Challenge

An object of the present invention is to overcome aforementioned problems that are caused by predicting the painful area of the patient depending on doctor's experience and by using the analog method.

The present invention is to provide a method for designing dental prosthesis, an apparatus for the same, and a recording medium for recording the same, which are able to reduce variations according to doctors and improve accuracy of prediction.

The Solution of Invention

In order to achieve the above object, a method for digitally designing dental prosthesis according to the present invention comprises the steps of storing a sore spot distribution model which is modeled based on factors related to sore spot where a patient feels pain due to pressure applied on mucous membrane of oral cavity when the patient wears the dental prosthesis; extracting feature information regarding the related factors of the sore spots for the patient from patient information and an oral image of the patient; predicting distribution area of sore spots of the patient based on the extracted feature information and the sore spot distribution model; and designing the dental prosthesis of the patient based on the predicted distribution area of sore spots.

Furthermore, in order to achieve the above object, an apparatus for digitally designing a dental prosthesis, comprises a sore spot model storage unit storing a sore spot distribution model which is modeled based on factors related to sore spot where a patient feels pain due to pressure applied on mucous membrane of oral cavity when the patient wears the dental prosthesis; a feature extraction unit extracting feature information regarding the related factors of the sore spots for the patient from patient information and an oral image of the patient; a sore spot prediction unit predicting distribution area of sore spots of the patient based on the extracted feature information and the sore spot distribution model; and a prosthesis design unit designing the dental prosthesis of the patient based on the predicted distribution area of sore spots.

The prosthesis design unit could make the prosthesis have buffer space on position adjacent to the predicted distribution area of sore spots.

In addition, the sore spot model storage unit could store the sore spot distribution model which is modeled based on statistical data regarding to at least one related factor of race, gender, or age.

Further, the sore spot model storage unit could store the sore spot distribution model having at least one of the relationship of maxilla and mandible, the type of antagonistic teeth, or the shape of palatine bone as the related factor.

Preferably, the apparatus could further comprise a sore spot correction unit correcting the predicted distribution area of sore spots based on data of sore spots detected in the oral image of patient.

The Effect of Invention

As mentioned above, the method and the apparatus according to the present invention predict sore spots where the patient feels pain due to pressure applied on his mucous membrane of oral cavity with high accuracy based on the model modeled with a plurality of data. Accordingly, the dental prosthesis which is more appropriate for the patient can be designed.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
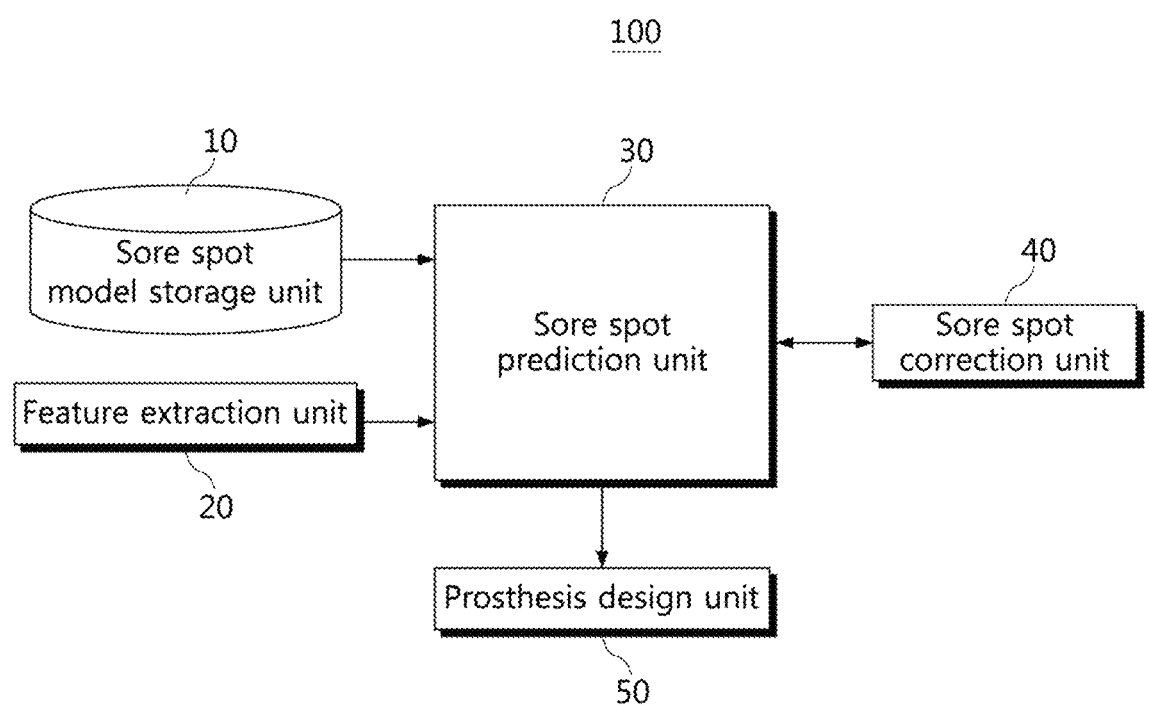
FIG. 1 is a block diagram for illustrating configuration of an apparatus for designing dental prosthesis according to an embodiment of the present invention.

Hereinafter, with reference to the accompanying drawings, preferred embodiments of the present invention will be described in detail. However, the explanation on the known functions and configurations that may obscure the subject matter of the present invention from the detailed description of the following description and from the accompanying drawings will be omitted. In addition, it needs to be noted that the same components throughout the drawings are referred to by the same reference numerals as possible.

The terms used in this specification and claims is not to be construed as limited to dictionary meanings, but can be defined and interpreted based on the meanings and concepts corresponding to technical aspects of the present invention in the principle that inventors define the terms appropriate to the concept of a term to describe his own invention in the best way. Therefore, the present embodiment and the configuration shown in the drawings and described in the specification is merely nothing but a preferable embodiment of the present invention, as not intended to represent all the technical concept of the present invention, so that it should be understood that many equivalents and varied modified embodiments of the present invention can exist at the time of the present application point.

An apparatus for designing dental prosthesis according to an embodiment of the present invention supports digital designs of prosthesis, including denture, which contacts with mucous membrane of oral cavity in order to replace teeth that have been lost. For reference, a term "prosthesis" which is used in this specification includes not only final prosthesis like a denture, which is worn consistently, but also objects needed in process of manufacturing the final prosthesis, like an individual tray.

FIG. 1 is a block diagram for illustrating configuration of an apparatus for designing dental prosthesis according to an embodiment of the present invention.

Referring to FIG. 1, the apparatus for designing dental prosthesis according to an embodiment of the present invention comprises a sore spot model storage unit 10, a feature extraction unit 20, a sore spot prediction unit 30, a sore spot correction unit 40, and a prosthesis design unit 50.

The sore spot model storage unit 10 stores a sore spot distribution model which has been modeled based on factors related to sore spot. The sore spot is a spot where a patient feels pain due to pressure applied on mucous membrane of oral cavity contacted with the dental prosthesis, when the patient moves for mastication or closes maxilla and mandible with wearing the dental prosthesis. The sore spot distribution model shows distribution pattern of the sore spots according to various related factors regarding the sore spot.

The related factors of the sore spots, for example, are the relationship of maxilla and mandible, the type of antagonistic teeth, or the shape of palatine bone, etc.

Regarding the relationship of maxilla and mandible, for example, in the case that there are mandibular teeth and no maxillary tooth, a full denture of maxilla manufactured in criteria with the position to the mandible teeth makes the patient feels pain severely. This is because the alveolar bone of maxilla becomes contract and shifts inwardly as time goes so that the cross-bite would cause the full denture to pressure the mucous membrane of oral cavity. For reference, in contrast with this, ordinary people have normal occlusion relationship that the maxillary teeth cover mandibular teeth. Like this example, the sore spots are closely related with the relationship of maxilla and mandible.

In addition, the sore spots are related with types of antagonistic teeth. For instance, the sore spots have different distribution pattern depending on whether antagonistic teeth are fixed teeth such as natural teeth, or detachable teeth. Further, in the case that the palatine bone is protruded, pain occurs when the dental prosthesis is contacted with the palatine bone. Like this, the sore spots are also related with the shape of palatine bone.

Furthermore, the sore spots tend to show different distribution pattern depending on race, gender, or age. Thus, the related factors of the sore spots encompass various factors that appear to be directly or indirectly related to the sore spots that can be grasped from the patient information and the oral image of the patient.

The sore spot distribution model can be modeled by hybrid modeling including epidemiological modeling and statistical modeling based on statistical data and experimental data collected from various institutions. In addition, the sore spots are closely related to the change in the thickness of the mucous membrane of oral cavity due to the pressurization, and generally the amount of variation in thickness is proportional to the pressure and the pain tends to increase accordingly. Therefore, the sore spot distribution model can include information regarding the degree of pressurization of the mucous membrane of oral cavity as well as the distribution location of the sore spots. The sore spot distribution model having the information regarding the degree of pressurization of the mucous membrane of oral cavity can be modeled based on thickness data of the mucous membrane of oral cavity before pressurization and after pressurization each.

The feature extraction unit 20 extracts feature information regarding the related factors of sore spots for the patient from patient information and the oral image of the patient. For reference, the patient information includes personal information and other information entered or stored, excluding images. The oral image means various medical images in which the oral cavity is taken including oral scan images, CT images, oral images, etc.

The feature information, which is for applying to the sore spot distribution model, means concrete attribute information corresponding to each related factor. For example, if the related factor is race, the feature information will be Mongoloid, Caucasian, Negroid, and if the related factor is gender, the feature information will be male and female. The feature extraction unit 20 stores categories categorized by attribute for each related factor, and extracts the feature information according to the categories.

The feature extraction unit 20 stores various image processing algorithms for recognizing and processing necessary portions in the oral images in order to extract the feature information of the related factors of the sore spots.

The sore spot prediction unit 30 applies the extracted feature information of the related factors to the sore spot distribution model and predicts distribution area where sore spots are concentrated in oral cavity of the patient. The predicted distribution area of sore spots can be displayed to be superimposed on the oral image of patient by a user interface unit (not shown). Moreover, the user interface unit could provide information regarding the degree of pressurization of the mucous membrane of oral cavity by varying color or marker indicating each distribution area of sore spots.

Meanwhile, the apparatus for designing dental prosthesis 100 according to an embodiment of the present invention further comprises a sore spot correction unit 40. Accordingly, the apparatus for designing dental prosthesis 100 predicts sore spots which have not been predicted by the sore spot distribution model and can contribute to more successful prosthesis designs.

The sore spot correction unit 40 recognizes sore spots by analysis of the oral image of the patient, and corrects the distribution area of the sore spots predicted by the sore spot distribution model based on the data regarding the recognized sore spots.

Generally, on sore spots, the tissues of the mucous membrane are observed to be white due to pressurization or slightly reddish as the skin is peeled off. The sore spot correction unit 40 detects sore spots by processing white or reddish color in the oral image or recognizing individual characteristics of the patient. Accordingly, the sore spot correction unit 40 detects sore spots that have not been predicted by the sore spot distribution model and compensates the predicted result.

In addition, since the sore spot distribution model is basically based on probability, when some sore spots predicted by the sore spot prediction unit 30 are analyzed that they are not actual sore spots according to predetermined criteria, the sore spot correction unit 40 can filter to exclude those sore spots.

The prosthesis design unit 50 digitally designs the dental prosthesis for the patient by applying the predicted distribution area of the sore spots. The prosthesis design unit 50 makes the dental prosthesis have a buffer space on position adjacent to the distribution area of the sore spots derived from the sore spot prediction unit 30 and the sore spot correction unit 40. The buffer space is a kind of space interposed between the mucous membrane of oral cavity and outer line of the prosthesis. The buffer space is for preventing pain caused by pressure on sore spots during masticatory movement after wearing the prosthesis.

Figure 2:
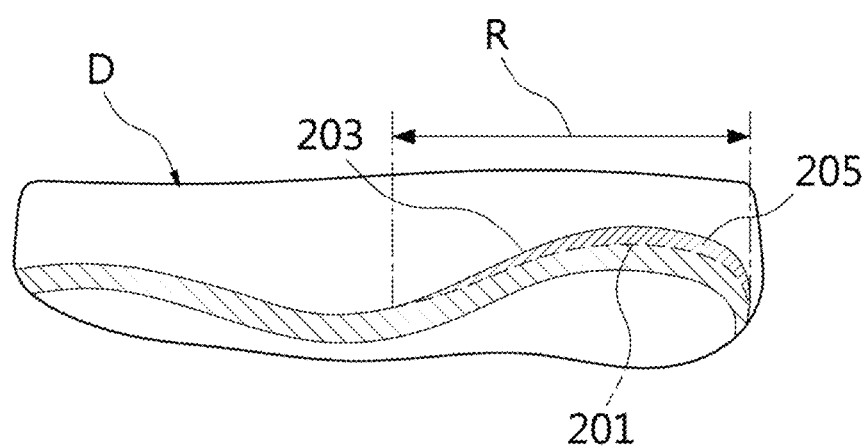
FIG. 2 is a reference figure for illustrating an example of how to design a dental prosthesis based on the predicted distribution area of sore spots.

FIG. 2 is a reference figure for illustrating an example of how to design the dental prosthesis based on the predicted distribution area of the sore spots. FIG. 2 shows a side view of the designed prosthesis D.

Referring to FIG. 2, the illustrated prosthesis D has a structure that the lower portion of the prosthesis D is in contact with the mucous membrane of oral cavity. The line 201 shown by the dotted line in FIG. 2 is corresponding to the actual oral shape of the patient. The line 203 shown by the solid line in FIG. 2 shows the outer line of the prosthesis D designed by applying the derived distribution area R of the sore spots.

It is a principle that the prosthesis D is designed according to the oral shape of the patient. However, the prosthesis is designed to have the buffer space 205 in the position adjacent to the distribution area R of the sore spots from the line of original oral shape. Therefore, it is possible to relieve the pain caused by direct friction with the prosthesis D and the mucous membrane of oral cavity.

The plurality of the buffer space can exist depending on the position of the distribution area of the sore spots, and the depth of the buffer space can be designed differently according to the degree of pressure on the sore spots. For example, the area having a large degree of pressure could have relatively deep buffer space. Accordingly more room can be provided against pressurization.

As mentioned above, the apparatus for designing dental prosthesis 100 according to an embodiment of the present invention predicts the distribution area of the sore spots objectively, and designs the prosthesis based on the predicted result. Therefore, it can design prosthesis more rapidly, and prevent pain caused by wearing the prosthesis in advance.

Figure 3:
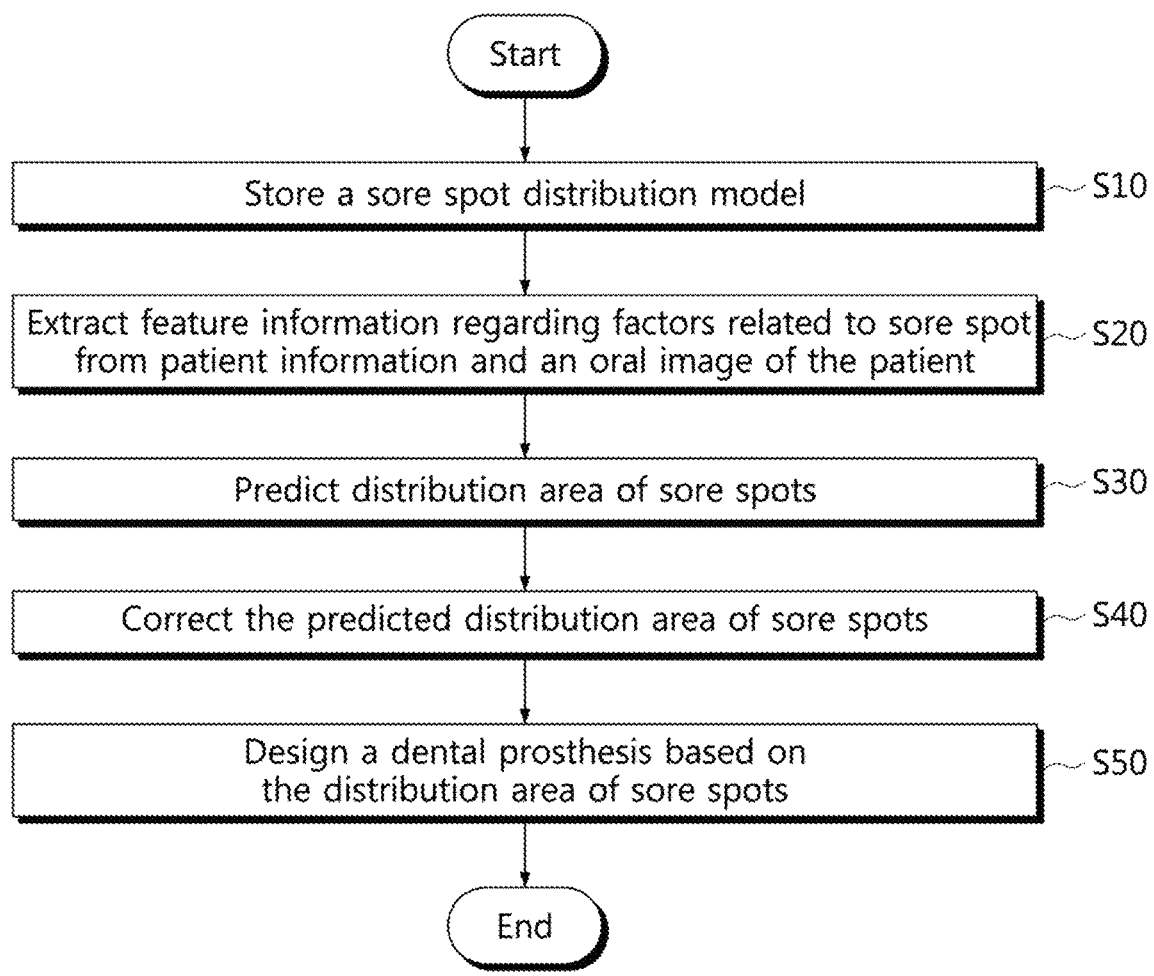
FIG. 3 is a flowchart that depicts a method for designing dental prosthesis.

FIG. 3 is a flowchart that depicts a method for designing dental prosthesis. Hereinafter, the operation of the apparatus for designing dental prosthesis 100 will be described with reference to FIG. 3.

Firstly, in step S10, it is required that a database for storing the sore spot distribution model is constructed. The sore spot distribution model is modeled based on the factors related to sore spot where the patient feels pain due to pressure applied on the mucous membrane of oral cavity when the patient wears the dental prosthesis.

The related factors of sore spots are information corresponding to variables of the sore spot distribution model. As mentioned above, the related factors can include various factors related to the distribution of the sore spots such as the relationship of maxilla and mandible, the type of antagonistic teeth, the shape of palatine bone, race, gender, age, etc. For reference, the sore spot distribution model can be modeled based on statistical data obtained clinically from various institutions and experimental data measuring the thickness of the mucous membrane of oral cavity before and after pressurization.

The sore spot distribution model is used for predicting the distribution area of the sore spots and/or the degree of pressurization of the sore spots, as described later.

Explaining process of prediction, first, the apparatus 100 extracts the feature information corresponding to the related factors of the sore spots based on the oral images of the patient and various types of patient information in step S20. The feature information is attribute information corresponding to the related factors of the sore spots. The feature information is extracted in accordance with predetermined formats of the feature information.

As the feature information has been extracted, in step S30, the distribution area of the sore spots of the patient is predicted by applying the feature information to the sore spot distribution model. Meanwhile, sore spots which have not been predicted by the sore spot distribution model can be further detected by sensing the color of mucous membrane of oral cavity, and the shape of palatine bone, etc. in oral images of the patient. And in step 40, the apparatus 100 corrects the predicted sore spots with the detected sore spots, thereby improving the prediction accuracy of sore spots. At this time, not only the automatic correction by analysis of the oral images of patient, but also the correction by the user input through the user interface unit could be performed.

After predicting the distribution area of the sore spots by mentioned steps, the prosthesis design is performed by reflecting the predicted result in step S50. In order to prevent pain caused by pressure on the sore spots when the patient wears the prosthesis, the prosthesis is designed to have the buffer space on position adjacent to the derived distribution area of the sore spots.

Figure 4:
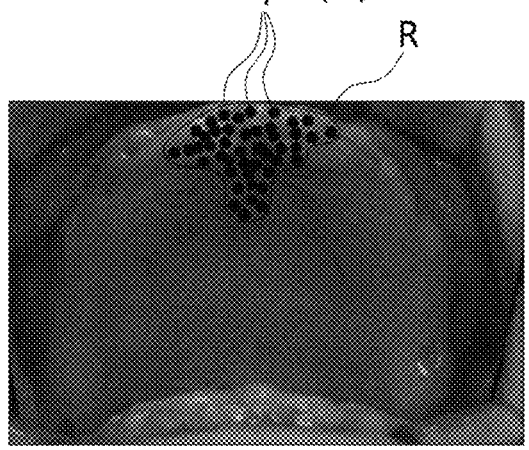
FIG. 4 illustrates an example of prosthesis designed by applying the distribution area of sore spots.
Figure 4:
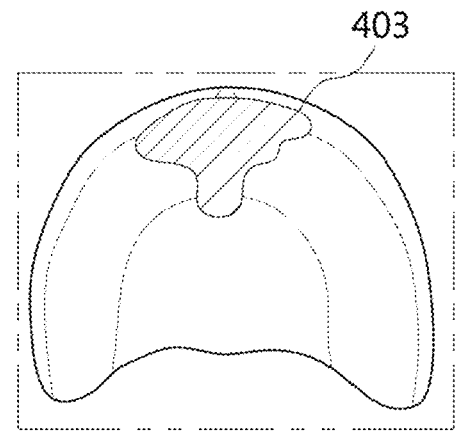

FIG. 4 illustrates an example of the prosthesis designed by applying the distribution area of the sore spots.

Referring to FIG. 4, (a) of FIG. 4 is a figure that the sore spots ss and the distribution area R of the sore spots are superimposed on the oral image of the patient, and (b) of FIG. 4 illustrates a denture base as an example of the designed prosthesis.

Referring to (b) of FIG. 4, the buffer space is provided at position 403 where the prosthesis is adjacent to the distribution area R of the sore spots, thus, the prosthesis has a margin against to the actual oral shape of the patient. For reference, the position 403 where the buffer space is provided is marked with deviant crease lines.

The digitally designed prosthesis is manufactured in real object by 3D printing or milling apparatus.

The steps, mentioned above, can be omitted or appropriately modified according to the situation.

For example, the step S40 correcting additionally the distributed area of the sore spots predicted by the sore spot distribution model could be optionally omitted. In addition, the information regarding the derived distribution area of the sore spots can also be used as data for determining positions of other components of the prosthesis. As an example, when a crown is disposed at a position corresponding to the distribution area of the sore spots, a function of providing warning or notification information could be additionally implemented.

As mentioned above, according to the apparatus 100 and the method for designing dental prosthesis, it is possible to solve problems of prior art of the analog method which depends on the doctor's experience. In addition, it is possible to rapidly design the prosthesis which is more appropriate for the patient by applying the result predicted objectively based on the model modeled with a plurality data to the digital design process. This present invention is expected to be particularly useful for cases of edentulous patient who wears the prosthesis having larger contact area with the mucous membrane of oral cavity.

The method for designing dental prosthesis according to the present invention could be embodied as a program that is executable in a computer and implemented as a variety of recording media such as a magnetic storage medium, an optical reading medium, and a digital storage medium.

Implementations of the various techniques described herein area digital electronic circuitry, or computer hardware, firmware, software, or may be implemented in a combination of them. Implementations can be implemented by a data processing device, for example, a programmable processor, a computer, or for processing by the operation of a plurality of computers, or to control the operation, the computer program product, i.e. the information carrier, for example, machine-readable apparatus (computer readable medium) or a radio signal. The computer program as stated above can be recorded in a programming language of any type, including a substituted or interpret compiled language, as a stand-alone program or as a module, component, subroutine, or in the computing environment, it may be deployed in any form, including as appropriate, including the use of other units. Computer program can be distributed across one or more computer or a number of sites to be processed on multiple computers at one site, and can be connected by a communication network.

Processors suitable for the processing of the computer program comprise as an example, includes both general and special purpose microprocessors, and more than one processors of any kind of digital computer. Generally, a processor may receive commands or data from read-only memory or random-access memory or both. The computer can include more than one memory device saving at least one processor and commands and data which executes commands. For example, it includes magnetism, magnetic-optical disks, or optical disks, or transmitting this data or combining both, or it can receive or transmit data or combine both. Information carriers appropriate for specifying computer program commands or data as an example, semi-conductor memory device, for example, includes hard disks, floppy disks, and magnetic tape, such as magnetic media, CD-ROM (Compact Disk Read Only Memory), DVD (Digital Video disk) and the like optical recording media, floptical disk, such as magneto-optical media, ROM (Read Only Memory), RAM (Random Access memory), comprises a flash memory, EPROM (Erasable Programmable ROM), EEPROM (Electrically Erasable Programmable ROM) etc. Processor and memory can be added or included by special purpose logic circuitry.

The present description herein includes details a number of specific implementations, but it cannot be understood as limited for any invention or scope for patent claims, rather to be understand as explanation about featuring specific implementation of specific invention. The specific features of the present description in context of each implementation herein can be implemented in combination in a single embodiment. Conversely, it also can be implemented in a plurality of embodiments with different features, any suitable sub-combination or separately described in the context of a single embodiment. Furthermore, the features can be combined as specific combinations or described as claimed in early, but one or more features from claimed combinations can be excluded from the combination in some cases, the claimed combination can be changed as sub-combination or its modifications.

Likewise, although it describes operations as particular order, it cannot be understood that performing those operations as the specific or sequential order described to achieve desired results or being performed for all described operations. In certain case, multi-tasking and parallel processing can be advantageous. In addition, separation of various system components in the embodiments described above should not be understood to require in any embodiment such a separation, the described program components and systems are generally integrated together in a single software product or be packaged into multiple software products number that should be understood.

On the other hand, the embodiments of the invention disclosed in the specification and drawings are not presented merely a specific example for clarity and are not intended to limit the scope of the invention. It addition to the embodiments disclosed herein another modification based on the technical ideas of the invention are possible embodiments, it will be apparent to those of ordinary skill in the art.

What is claimed is:

1. A method for digitally designing a dental prosthesis, comprising:
   storing a sore spot distribution model which is modeled based on factors related to sore spot where a patient feels pain due to pressure applied on mucous membrane of oral cavity when the patient wears the dental prosthesis;
   extracting feature information regarding the related factors of the sore spots for the patient from patient information and an oral image of the patient;
   predicting distribution area of sore spots of the patient based on the extracted feature information and the sore spot distribution model; and
   designing the dental prosthesis of the patient based on the predicted distribution area of sore spots,
   wherein the dental prosthesis is a denture, wherein the sore spot distribution model includes information regarding locations of the sore spots and degree of pressurization of the mucous membrane, and wherein the dental prosthesis is designed to have a buffer space on position adjacent to the predicted distribution area of the sore spots.

2. A non-transitory computer-readable recording medium having a program to execute the method for designing a dental prosthesis according to claim 1.

3. The method according to claim 1, wherein the depth of the buffer space is designed to be proportional to the degree of pressurization of the sore spots.

4. The method according to claim 1, wherein the sore spot distribution model is modeled based on statistical data regarding to at least one related factor of race, gender, or age.

5. The method according to claim 1, wherein the related factors of the sore spots include at least one of relationship of maxilla and mandible, type of antagonistic teeth, or shape of palatine bone.

6. The method according to claim 1, further comprises correcting the predicted distribution area of the sore spots based on data of sore spots detected in the oral image of the patient.

7. A non-transitory computer-readable recording medium having a program to execute the method for designing a dental prosthesis according to claim 3.

8. A non-transitory computer-readable recording medium having a program to execute the method for designing a dental prosthesis according to claim 4.

9. A non-transitory computer-readable recording medium having a program to execute the method for designing a dental prosthesis according to claim 5.

10. The method according to claim 6, wherein the sore spots that have not been predicted based on the sore spot distribution model are detected in the oral image by processing the region of white color where color is changed due to pressurization or the region of reddish color where color is changed as skin is peeled off.

11. A non-transitory computer-readable recording medium having a program to execute the method for designing a dental prosthesis according to claim 6.

12. A non-transitory computer-readable recording medium having a program to execute the method for designing a dental prosthesis according to claim 10.

13. An apparatus for digitally designing a dental prosthesis, comprising:
a data processing device;
a sore spot model storage unit storing a sore spot distribution model which is modeled based on factors related to sore spot where a patient feels pain due to pressure applied on mucous membrane of oral cavity when the patient wears the dental prosthesis;
a feature extraction unit extracting feature information regarding the related factors of the sore spots for the patient from patient information and an oral image of the patient;
a sore spot prediction unit predicting distribution area of sore spots of the patient based on the extracted feature information and the sore spot distribution model; and
a prosthesis design unit designing the dental prosthesis of the patient based on the predicted distribution area of sore spots,
wherein the dental prosthesis is a denture,
wherein the sore spot distribution model includes information regarding locations of the sore spots and the degree of pressurization of the mucous membrane, and
wherein the prosthesis design unit makes the prosthesis to have a buffer space on position adjacent to the predicted distribution area of the sore spots.

14. The apparatus according to claim 13, wherein the sore spot model storage unit stores the sore spot distribution model which is modeled based on statistical data regarding to at least one related factor of race, gender, or age.

15. The apparatus according to claim 13, wherein the sore spot model storage unit stores the sore spot distribution model having at least one of relationship of maxilla and mandible, type of antagonistic teeth, or shape of palatine bone as the related factor.

16. The apparatus according to claim 13, further comprising:
a sore spot correction unit correcting the predicted distribution area of the sore spots based on data of sore spots detected in the oral image of the patient.

* * * * *